United States Patent
Kahl (10) Patent No.: US 8,851,212 B2
(45) Date of Patent: Oct. 7, 2014

(54) FORWARD CARRIER ASSEMBLY WITH A REVERSIBLE INTER-AXLE DIFFERENTIAL FOR A TANDEM AXLE VEHICLE, A POWERTRAIN FOR A TANDEM AXLE VEHICLE, AND A TANDEM AXLE VEHICLE

(75) Inventor: Michael E. Kahl, Hagerstown, MD (US)

(73) Assignee: Mack Trucks, Inc., Greensboro, NC (US)

( * ) Notice: Subject to any disclaimer, the term of this patent is extended or adjusted under 35 U.S.C. 154(b) by 0 days.

(21) Appl. No.: 14/235,417

(22) PCT Filed: Aug. 31, 2011

(86) PCT No.: PCT/US2011/050098
§ 371 (c)(1),
(2), (4) Date: Jan. 27, 2014

(87) PCT Pub. No.: WO2013/032477
PCT Pub. Date: Mar. 7, 2013

(65) Prior Publication Data
US 2014/0179483 A1   Jun. 26, 2014

(51) Int. Cl.
*B62D 61/10* (2006.01)
*F16H 48/06* (2006.01)
*B60K 17/36* (2006.01)

(52) U.S. Cl.
CPC ............... *F16H 48/06* (2013.01); *B60K 17/36* (2013.01)
USPC ......... 180/24.11; 475/221; 475/231; 475/230

(58) Field of Classification Search
CPC .. B60K 17/16; B60K 17/36; F16H 2048/204; F16H 2048/305; F16H 2048/426; F16H 48/08; F16H 48/24; F16H 48/30; F16H 48/32; F16H 48/34; F16H 48/38; F16H 48/40
USPC ................ 180/24.11; 475/221, 230, 231
See application file for complete search history.

(56) References Cited

U.S. PATENT DOCUMENTS

| | | | |
|---|---|---|---|
| 1,760,839 | A | 5/1930 | Drew |
| 2,198,616 | A | 4/1940 | Hickman |

(Continued)

OTHER PUBLICATIONS

International Search Report (Feb. 1, 2012) from corresponding International Application PCT/US2011/050098.

*Primary Examiner* — Faye M Fleming
*Assistant Examiner* — Darlene P Condra
(74) *Attorney, Agent, or Firm* — WRB-IP LLP (57) ABSTRACT

A tandem axle vehicle includes a powertrain. The powertrain includes an input shaft, a forward drive axle assembly including a forward carrier assembly including a forward differential, and a rear drive axle assembly coupled to the forward drive axle assembly via a connecting driveshaft and including a rear carrier assembly including a rear differential. The forward carrier assembly includes an inter-axle differential (IAD), the IAD including an IAD housing, a differential spider including a plurality of legs attached to the IAD housing and a plurality of spider gears mounted on the legs, a first side gear engaged with the spider gears on a first side of the spider and arranged to drive a shaft for driving the driveshaft, and a second side gear engaged with the spider gears on a second side of the spider and arranged to drive the forward differential. A clutch is movable between an unlocked position, the clutch rotationally coupling the input shaft and the IAD housing when in the unlocked position, and a reverse position, the input shaft being rotationally decoupled from the IAD housing when the clutch is in the reverse position.

22 Claims, 5 Drawing Sheets

(56) References Cited

U.S. PATENT DOCUMENTS

| | | |
|---|---|---|
| 2,666,337 A | 1/1954 | Brownyer |
| 3,915,032 A | 10/1975 | Ottemann |
| 3,916,728 A * | 11/1975 | Behar et al. .................... 475/231 |
| 4,271,722 A | 6/1981 | Campbell |
| 4,497,220 A | 2/1985 | Grinde |
| 4,498,355 A | 2/1985 | Schou |
| 4,677,873 A | 7/1987 | Eastman et al. |
| 5,176,590 A | 1/1993 | Haydock |
| 5,404,963 A * | 4/1995 | Crepas et al. ................ 184/6.12 |
| 6,200,240 B1 | 3/2001 | Oates |
| 6,432,020 B1 | 8/2002 | Rivera et al. |
| 6,514,169 B2 * | 2/2003 | Turner et al. .................... 475/222 |
| 6,648,788 B1 | 11/2003 | Sullivan |
| 6,840,882 B2 | 1/2005 | Oates et al. |
| 6,884,196 B1 | 4/2005 | Ziech |
| 7,211,017 B2 | 5/2007 | Green et al. |
| 7,291,083 B2 | 11/2007 | Almaguer |
| 7,758,462 B2 | 7/2010 | Veldman et al. |
| 2003/0190992 A1 * | 10/2003 | Holman et al. .............. 475/221 |
| 2004/0079562 A1 | 4/2004 | Oates et al. |
| 2004/0176206 A1 * | 9/2004 | Oates et al. .................... 475/221 |
| 2006/0030448 A1 * | 2/2006 | Almaguer ..................... 475/231 |
| 2006/0276297 A1 * | 12/2006 | Ziech ........................... 475/221 |
| 2010/0248888 A1 * | 9/2010 | Hamperl et al. .............. 475/221 |

* cited by examiner

FORWARD CARRIER ASSEMBLY WITH A REVERSIBLE INTER-AXLE DIFFERENTIAL FOR A TANDEM AXLE VEHICLE, A POWERTRAIN FOR A TANDEM AXLE VEHICLE, AND A TANDEM AXLE VEHICLE

BACKGROUND AND SUMMARY

The present invention relates generally to a tandem axis vehicle and, more particularly, to a forward carrier assembly for a tandem axle vehicle.

It is ordinarily desirable that a vehicle have at least one reverse gear in addition to one or more forward gears. Typically, this is accomplished by providing a transmission including one or more countershafts with a plurality of countershaft gears thereon, the countershafts usually being driven by a geared connection with an input shaft driven by an engine. The gears on the countershaft mesh with gears mounted on, for example, an output shaft. At any given time, one of the gears on the output shaft drives is drivingly coupled to the output shaft, such as by a gear shift, to drive the output shaft. For the reverse gear, an idler gear is disposed between the countershaft gear and the output shaft gear so that rotation of the output shaft when the reverse gear is engaged is in the opposite direction from rotation of the output shaft when any of the forward gears is engaged, without having to alter the direction of rotation of the input shaft or the countershaft. Providing additional reverse gears adds complexity to the transmission.

It is desirable to provide a vehicle and powertrain that does not require a transmission with a separate reverse gear. It is also desirable to provide a vehicle and powertrain that permit provision of a substantial number of reverse gears without substantial additional transmission complexity.

According to an aspect of the present invention, a tandem axle vehicle comprises a powertrain, the powertrain comprising an input shaft, a forward drive axle assembly comprising a forward carrier assembly including a forward differential, a rear drive axle assembly coupled to the forward drive axle assembly via a connecting driveshaft and comprising a rear carrier assembly including a rear differential, the forward carrier assembly comprising an inter-axle differential (IAD), the IAD comprising an IAD housing, a differential spider comprising a plurality of legs attached to the IAD housing and a plurality of spider gears mounted on the legs, a first side gear engaged with the spider gears on a first side of the spider and arranged to drive a shaft for driving the driveshaft, and a second side gear engaged with the spider gears on a second side of the spider and arranged to drive the forward differential, and a clutch movable between an unlocked position, the clutch rotationally coupling the input shaft and the IAD housing when in the unlocked position, and a reverse position, the input shaft being rotationally decoupled from the IAD housing when the clutch is in the reverse position.

According to another aspect of the present invention, a forward carrier assembly for a tandem axle vehicle comprises an inter-axle differential (IAD), the IAD comprising an IAD housing having an internal spline, a differential spider comprising a plurality of legs attached to the IAD housing and a plurality of spider gears mounted on the legs, a first side gear engaged with the spider gears on a first side of the spider, the first side gear having an internal spline, a second side gear engaged with the spider gears on a second side of the spider, and a collar having one more external splines, the collar being movable between a first position in which the one or more external splines engage with the internal spline of the IAD housing and the internal spline of the first side gear, and a second position in which the one or more external splines is disengaged from the internal spline of the IAD housing and engaged with the internal spline of the first side gear.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
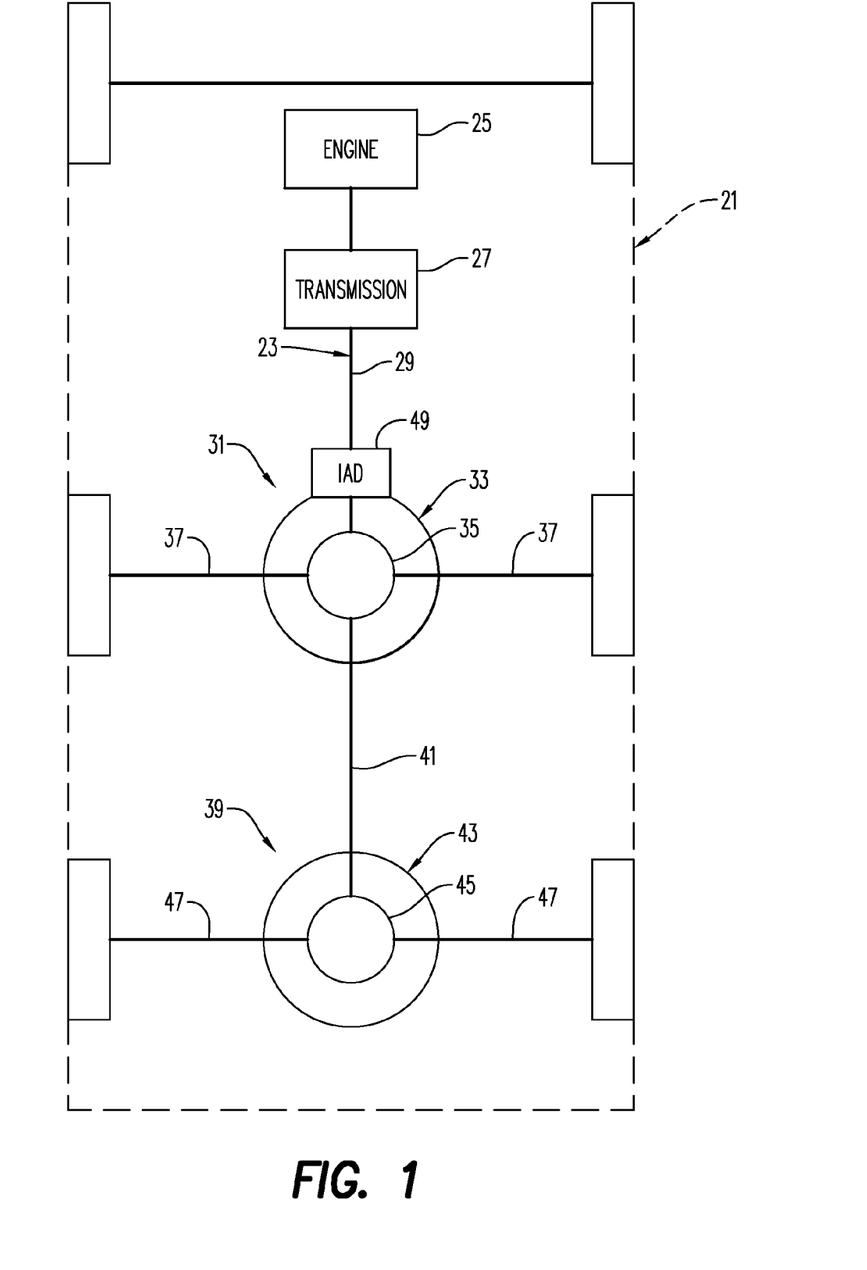
FIG. 1 is a schematic view of a tandem axle vehicle according to an aspect of the present invention.

A tandem axle vehicle 21 is shown schematically (and in phantom) in FIG. 1. The vehicle 21 comprises a powertrain 23 comprising an engine 25 and a transmission 27 arranged in a conventional manner to drive an input shaft 29.

The input shaft 29 is connected to a forward drive axle assembly 31. The forward drive axle assembly 31 comprises a forward carrier assembly 33 including a forward differential 35 operably connected to a pair of forward axle shafts 37. A rear drive axle assembly 39 is coupled to the forward drive axle assembly 31 via a connecting driveshaft 41 and comprises a rear carrier assembly 43 including a rear differential 45 operably connected to a pair of rear axle shafts 47.

Figure 2:
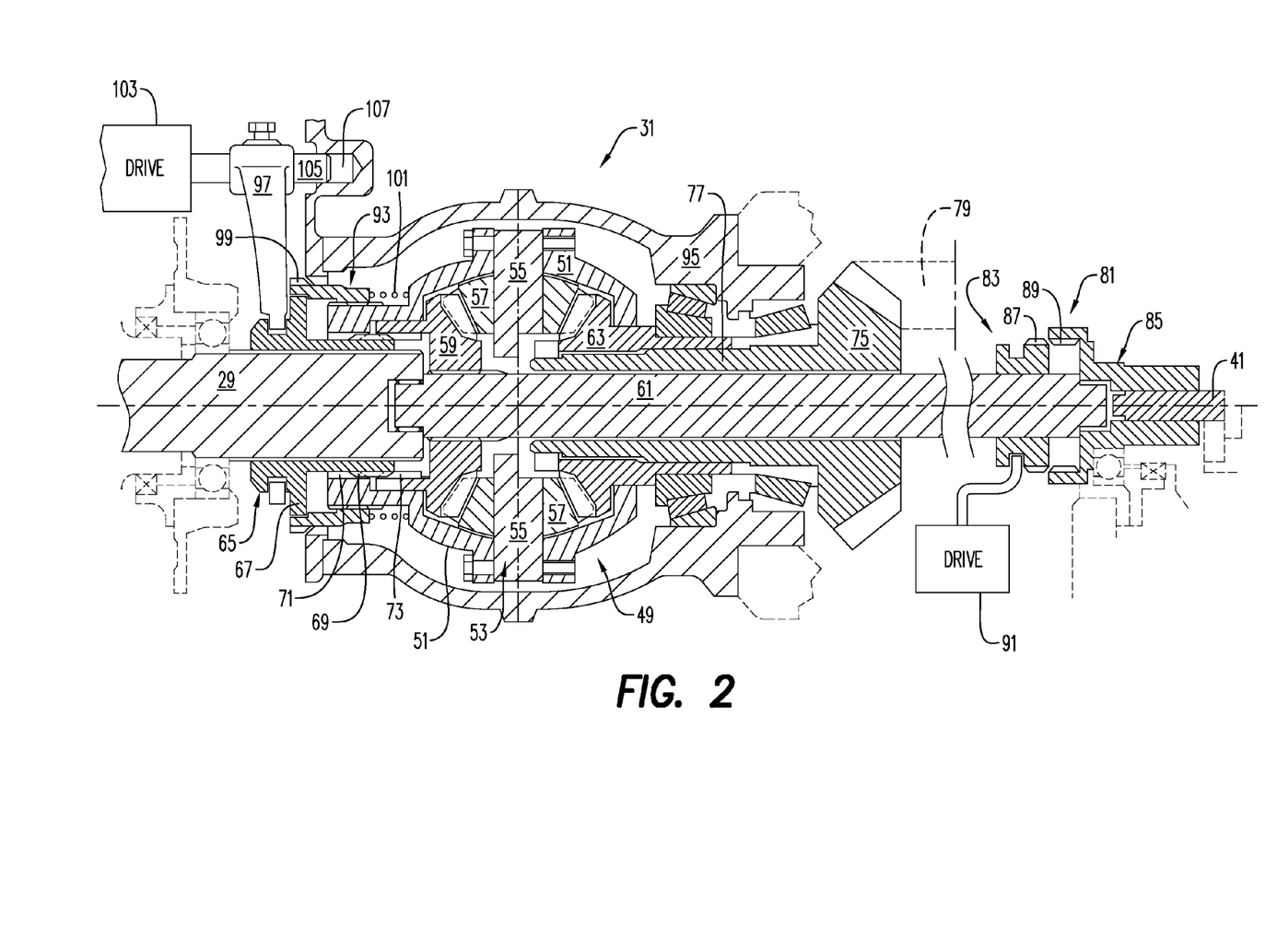
FIG. 2 is a cross-sectional view of a portion of a powertrain for a tandem axle vehicle according to an aspect of the present invention.

The forward carrier assembly 33 comprises an inter-axle differential (IAD) 49 seen in FIG. 2. The IAD 49 comprises an IAD housing 51, a differential spider 53 comprising a plurality of legs 55 attached to the IAD housing and a plurality of spider gears 57 mounted on the legs. The IAD 49 further comprises a first side gear 59 engaged with the spider gears 57 on a first side of the spider 53 and arranged to drive a shaft 61 for driving the driveshaft 41. The IAD 49 further comprises a second side gear 63 engaged with the spider gears 57 on a second side of the spider 53 and arranged to drive the forward differential 35.

Figure 3A:
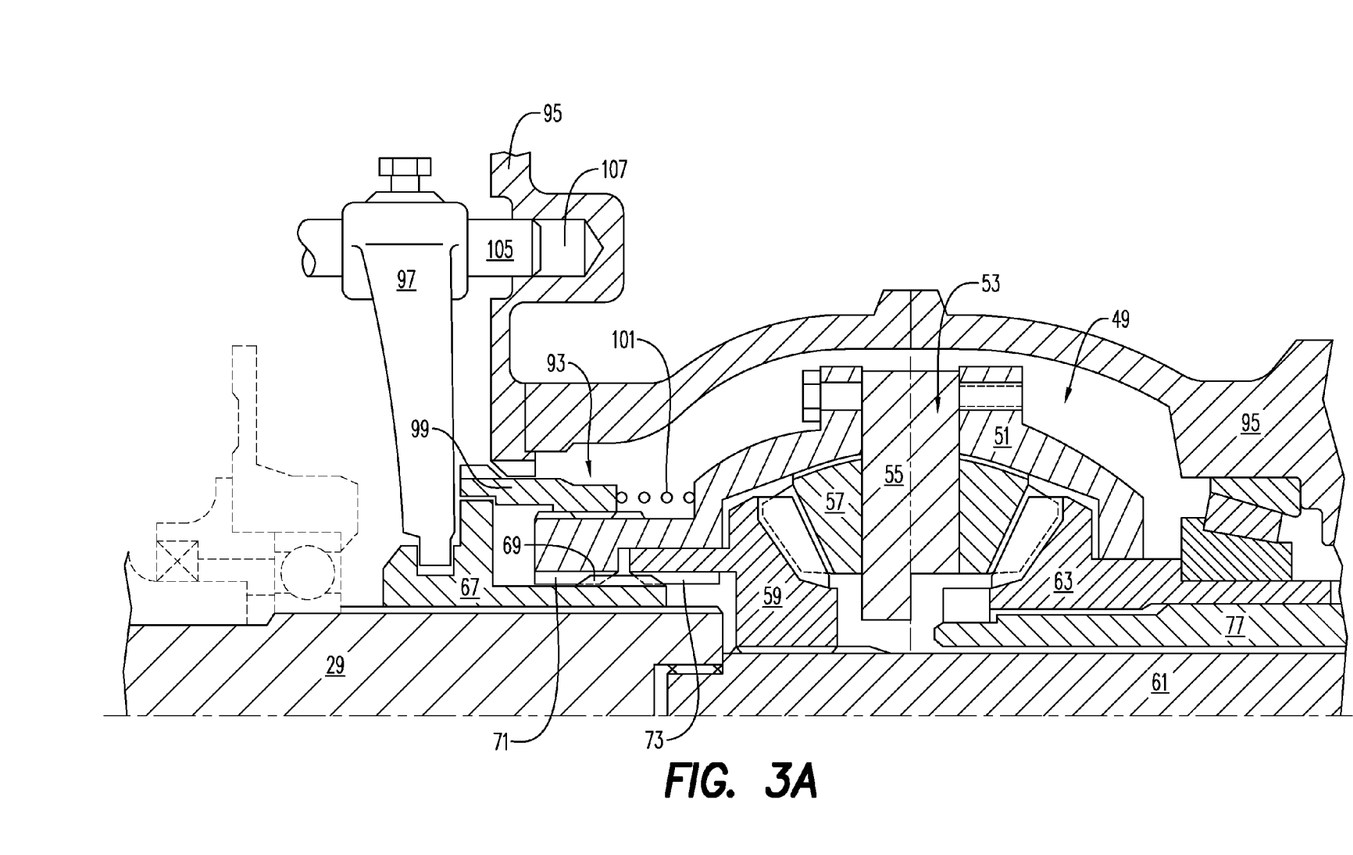
FIGS. 3A, 3B, and 3C are cross-sectional views of a portion of a forward carrier assembly for a tandem axle vehicle according to an aspect of the present invention showing operation in a locked, unlocked, and reverse mode, respectively.
Figure 3B:
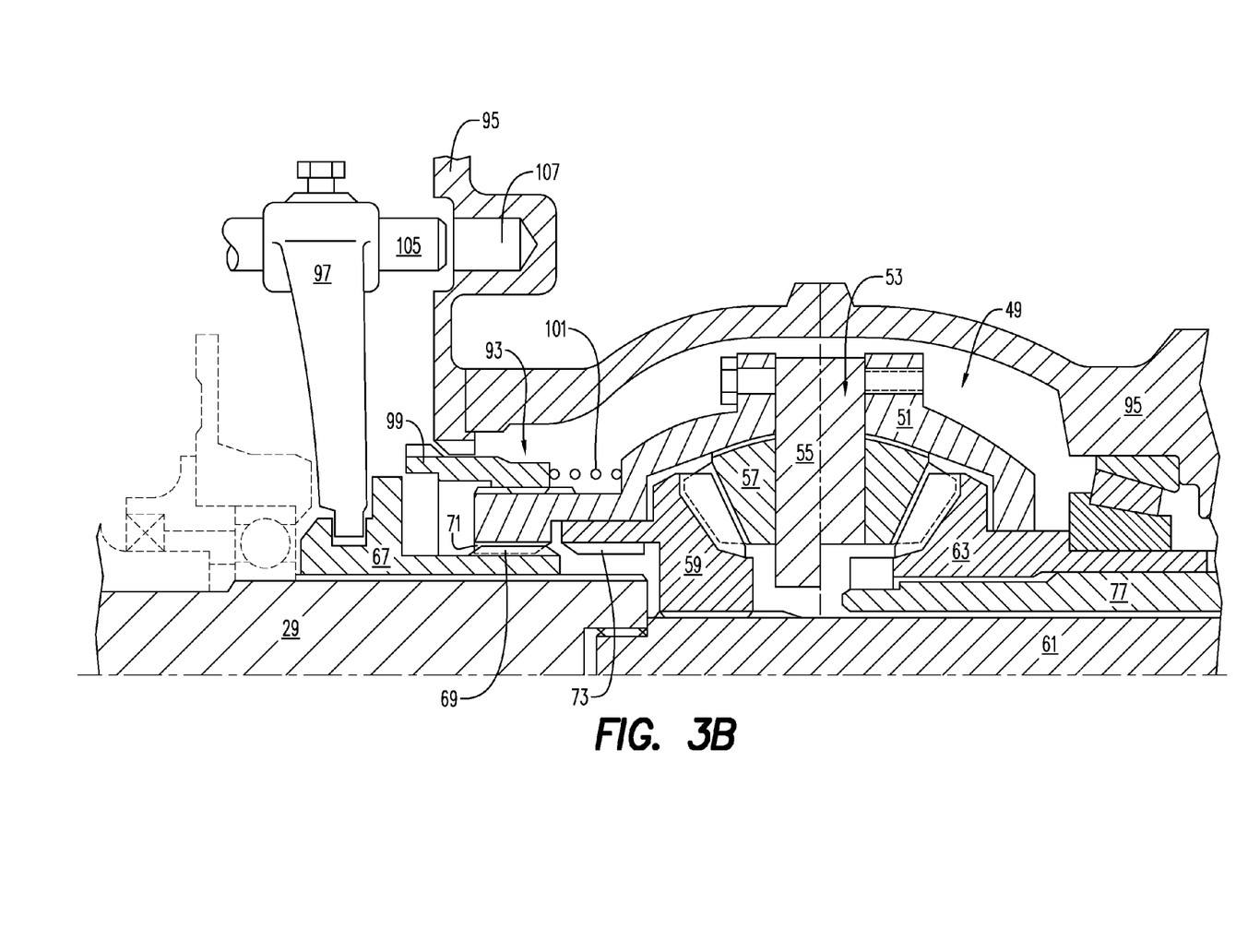
Figure 3C:
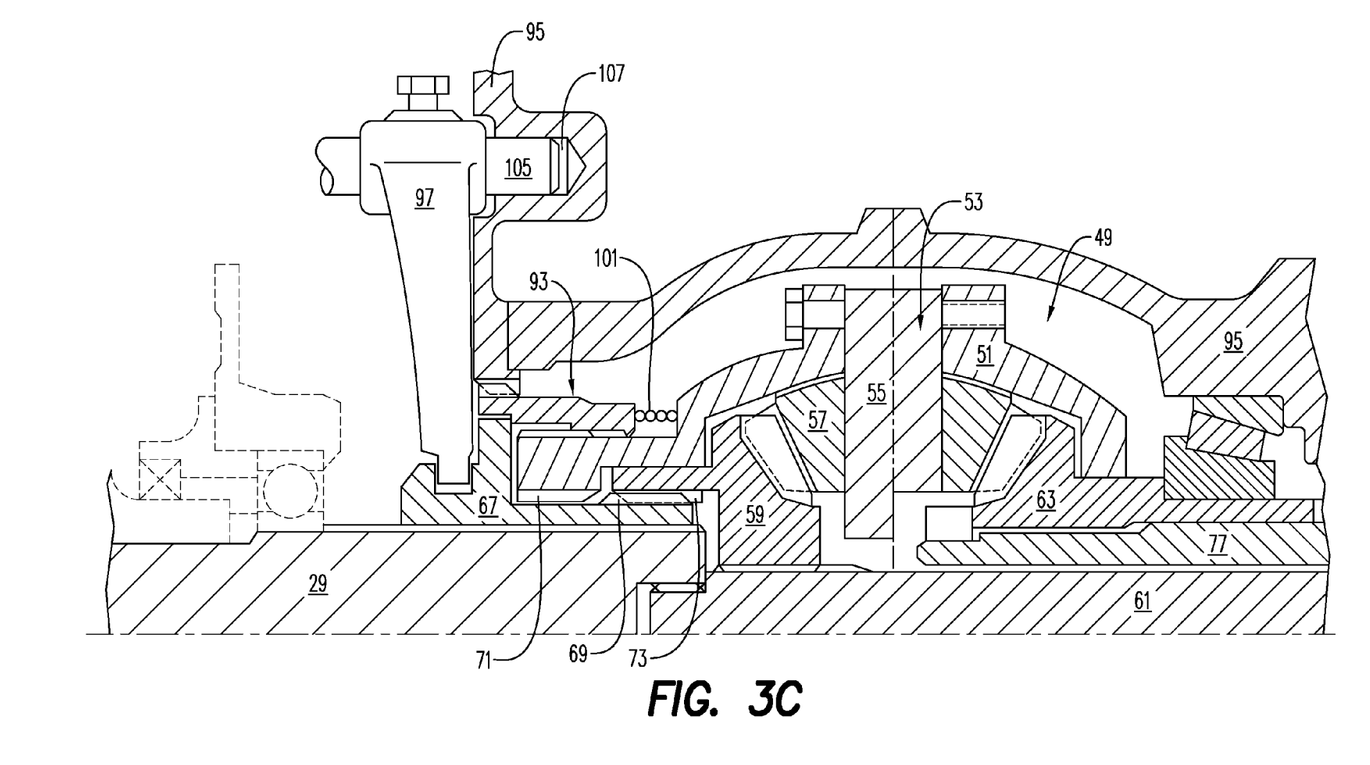

A clutch 65 is associated with the forward carrier assembly and is movable between a "locked" position as shown in FIG. 3A, a "normal" or "unlocked" position as seen in FIG. 3B, and a reverse position as seen in FIG. 3C. In both the unlocked and locked positions (FIGS. 3A and 3B), the clutch 65 rotationally couples the input shaft 29 and the IAD housing 51. In the reverse position (FIG. 3C), the clutch 65 is in a position such that the input shaft 29 is rotationally decoupled from the IAD housing 51.

Ordinarily, the input shaft 29 only drives the first side gear 59 when the clutch 65 is in the reverse position (FIG. 3C). Rotation of the input shaft 29 in a first direction—say, clockwise—rotates the first side gear 59 in the first direction, i.e., clockwise, the first side gear turns the spider gears 57, and the spider gears turn the second side gear 63 in a direction opposite from the first direction, i.e., counterclockwise. By disengaging the rear drive axle assembly 39 in some suitable fashion when the clutch 65 is moved to the reverse position, it is possible to omit providing a reverse gear in the transmission 27, and the vehicle 21 can be driven in reverse in the same number of gears that the transmission permits the vehicle to be driven in the forward direction. Stated differently, the rotation of the input shaft 29 does not need to be reversed in order to drive the vehicle 21 in reverse.

In the embodiment shown in FIGS. 2 and 3A-3C, the clutch 65 comprises a collar 67 comprising one or more external splines 69 adapted to mate with internal splines 71 and 73 on the IAD housing 51 and the first side gear 59, respectively. The collar 67 is axially slidable on and non-rotatable relative to the input shaft 29 (which is supported by structures such as bearings shown in phantom and not numbered in FIG. 2) and axially slidable to move the one or more external splines 69 of the collar into and out of engagement with the internal splines 71 and 73 on the IAD housing 51 and the first side gear 59, respectively. Ordinarily, the one or more external splines 69 of the collar 67 is always engaged with at least one of the internal spline 71 on the IAD housing 51 and the internal spline 73 on the first side gear 59. A suitable driving means 103, such as a pneumatic or hydraulic piston and cylinder arrangement (ordinarily a three position piston) that advances or withdraws a pin 105 and fork 97 connected to the collar 67, can be provided to slide the collar relative to the input shaft 29.

When, as seen in FIG. 3B (showing the normal, unlocked position), the one or more external splines 69 of the collar 67 is engaged with the internal spline 71 on the IAD housing 51 and disengaged from the internal spline 73 on the first side gear 59, the forward drive axle assembly 31 is configured for normal forward drive operation in which the pair of forward axle shafts 37 are driven in a forward direction and the pair of rear axle shafts 47 are driven in the forward direction, with the IAD 49 splitting the driving force from the input shaft 29 between the forward axle shafts and the rear axle shafts. More particularly, when the input shaft 29 rotates, the collar 67 and the IAD housing 51 rotate with the input shaft. The spider 53 rotates with the IAD housing 51, and the first side gear 59 and the second side gear 63, which are both engaged with spider gears 57 on the spider, rotate with the spider. In the normal position of FIG. 3B, the spider gears 57 are able to rotate on the spider legs 55 which accommodates any necessary differential in speed between the first side gear 59 and the second side gear 63 and, ultimately, the forward differential 35 (FIG. 1) and the rear differential 45 (FIG. 1).

The first side gear 59 drives the shaft 61 which, in turn, drives the driveshaft 41 that is connected to the rear carrier assembly 43 (FIG. 1) for ultimately driving the rear axle shafts 47. In the illustrated embodiment, the second side gear 63 is arranged to drive a pinion gear 75 (FIG. 2), such as by a splined connection between an internal opening in the second side gear and external splines on a shaft 77 extending from the pinion gear. A shaft of the second side gear 63 can be supported relative to the forward carrier assembly housing 95 by bearings (seen in FIGS. 2-3C and not numbered). The pinion gear 75 is in meshing engagement with a ring gear 79 (a portion of which is shown in phantom in FIG. 2), and the ring gear is operably coupled to the forward differential 35 for driving the forward axle shafts 37 (FIG. 1). The shaft 61 can extend through the pinion gear 75, and may be coaxial with the pinion gear, which can facilitate providing a space-efficient arrangement.

As seen in FIG. 2, a second clutch 81 can be arranged to connect the shaft 61 and the driveshaft 41 when the clutch 65 is in the normal position shown in FIG. 3B or the locked position shown in FIG. 3A, and to disconnect the shaft and the driveshaft when the clutch is in the reverse position shown in FIG 3C. While a variety of structures suitable for use as the second clutch 81 might be provided, the particular embodiment of the second clutch shown in FIG. 2 comprises a first collar 83 slidable axially but non-rotatable relative to the shaft 61, such as by being attached via a splined connection, and a second collar 85 non-rotatably (and usually non-slidably) attached to the driveshaft 41. The first collar 83 has external splines 87 that are adapted to engage internal splines 89 on the second collar 85 to connect the shaft 61 and the driveshaft 41. A suitable driving means 91, such as a pneumatic or hydraulic piston and cylinder arrangement (ordinarily a two position piston), can be provided to slide the first collar 83 relative to the shaft 61 between a position in which the first collar is connected to the second collar 85 and a position in which it is disconnected from the second collar. A controller (not shown) can be provided to control the driving means 91 to position the collars 83 and 85 so that they connect the shaft 61 and the driveshaft 41 when the clutch 65 is in the unlocked position (FIG. 3A) or locked position (FIG. 3C) and to control the driving means to position the collars so that they are disengaged and the shaft and the driveshaft are not connected when the clutch is in the reverse position (FIG. 3B).

As seen in FIG. 2, a third clutch 93 is provided and is arranged to rotationally lock the IAD housing 51 relative to a forward carrier assembly housing 95 when the clutch 65 is in the reverse position. While a variety of structures suitable for use as the third clutch 93 might be provided, the particular embodiment of the third clutch shown in FIG. 2 comprises a fork 97 mounted on the collar 67 and a spring-loaded member, referred to here as a piston 99, arranged to be moved by the fork to compress a spring 101 when the collar moves as the clutch moves to the reverse position. The piston 99 is splined to the IAD housing 51 and the spring 101 is disposed between a portion of the IAD housing 51 and the piston. When the collar 67 moves the piston 99 to compress the spring 101 as shown in FIG. 3C, a spline on the piston 99 engages a spline on the forward carrier assembly housing 95 so that the IAD housing 51, also splined to the piston, is locked relative to the forward carrier assembly housing 95. When the collar 67 moves away from the forward carrier assembly housing 95 and the IAD housing 51, the spring 101 moves the piston 99 so that the piston disengages from the forward carrier assembly housing and relative rotation between the IAD housing and the forward carrier housing assembly is permitted as seen in FIGS. 3 A and 3B. When the clutch 65 is in the reverse position (FIG. 3C) and the input shaft 29 turns, the first side gear 59 will turn, the first side gear 59 will turn the spider gears 57, the spider gears will turn the second side gear 61 in the direction opposite the direction that the first side gear is turned (e.g., reverse). By preventing movement of the IAD housing 51 relative to the forward carrier assembly housing 95 via the third clutch 93, the IAD housing will not rotate as the result of, e.g., force applied to the IAD housing from the first side gear through the spider gears 57 and the spider legs 55, which will ordinarily interfere with and/or prevent operation in the reverse mode. In this manner, what is here denominated as a "reversible inter-axle differential" can be provided.

The clutch 65 can be movable to the locked position shown in FIG. 3A in which the clutch rotationally couples the input shaft 29 with both the IAD housing 51 and the first side gear 59. More particularly, the collar 67 can be positioned so that the external splines 69 on the collar simultaneously mate with the internal splines 71 and 73 on both the IAD housing 51 and the first side gear 59, respectively. In this locked position, the rotation speed of the first side gear 59 and the IAD housing 51 are always equal. Particularly in exceptionally severe operating conditions, such as where road surfaces are so slippery that it is difficult to achieve traction, it is common to utilize the locked position to couple tandem carriers together in a straight-through positive drive arrangement to enable the operator to achieve maximum traction.

Operation of the powertrain 23 with the clutch 65 in the locked, unlocked, and reverse positions shown in FIGS. 3A, 3B, and 3C, respectively, is now described. In the locked position of FIG. 3A, the collar 67 of the clutch 65 is positioned so that the external splines 69 on the collar simultaneously mate with the internal splines 71 and 73 on both the IAD housing 51 and the first side gear 59, respectively. Rotation of the input shaft 29 and the collar 67 drives the first side gear 59 and the IAD housing 51 at the same rotational speed and in the same rotational direction as the input shaft. The rotation of the IAD housing 51 and the spider 53 attached thereto transfers, through the spider gears 57, a driving force to the second side gear 63 in the same rotational direction as the rotational direction of the IAD housing (and the input shaft 29 and the first side gear 59). If the spider gears 57 do not turn on the spider legs 55, the rotational speed of the second side gear 63 is equal to the rotational speed of the IAD housing 51 and the first side gear 59. If the spider gears 57 turn on the spider legs 55, then the rotational speed of the second side gear 63 will differ from the rotational speed of the IAD housing 51 and the first side gear 59. The pin 105 on which the fork 97 on the collar 67 is mounted is ordinarily slidably received in an opening 107 in the forward carrier assembly housing 95. The pin 105 is moved by the driving means 103, ordinarily a hydraulic or pneumatic a piston, to move the fork 97 and collar 67. Ordinarily, the pin 105 and opening 107 will be of sufficient length so that some length of the pin is always disposed in the opening, however, the pin and opening may be sized to permit the pin to be removed irons the opening under certain circumstances, such as is shown in FIG. 3B.

In the unlocked position shown in FIG. 3B, the collar 67 of the clutch 65 is positioned so that the external splines 69 on the collar mate only with the internal splines 71 of the IAD housing 51 and are disengaged from the internal splines 73 of the first side gear 59. Rotation of the input shaft 29 and the collar 67 drives the IAD housing at the same rotational speed and in the same rotational direction as the input shaft. The rotation of the IAD housing 51 and the spider 53 attached thereto transfers, through the spider gears 57, a driving force to both the first side gear 59 and the second side gear 63 in the same rotational direction as the rotational direction of the input shaft 29 the IAD housing. If it is necessary that the first side gear 59 and the second side gear 63 turn at different rotational speeds, such as when the forward axle shafts 37 (FIG. 1) turn at a different speed than the rear axle shafts 47 (FIG. 1) the spider gears 57 will, turn on the spider legs 55 to permit the different rotational speeds.

In the reverse position shown in FIG. 3C, the collar 67 of the clutch 65 is positioned so that the external splines 69 on the collar mate only with the internal splines 73 of the first side gear 59 and are disengaged from the internal splines 71 of the IAD housing 51. Ordinarily, if the pin 105 on the fork 97 is removed from the opening 107 in the forward carrier housing assembly 95, the drive 103 moves the pin 105 to move the collar 67 and the fork 97 and the pin is received in the opening 107 in the forward carrier assembly housing. As the pin 105 is moved toward the forward carrier housing assembly 95, the fork 97 (or the collar 67) contacts the spring loaded piston 99 and compresses the spring 101 against the IAD housing 51. Splines on the piston 99 and the forward carrier housing assembly engage so that the IAD housing is substantially unable to rotate relative to the forward carrier assembly housing. At the same time, the first collar 83 of the second clutch 81 is moved relative to the second collar 85 of the second clutch to disconnect the driveshaft 41 from the shaft 61. Rotation of the input shaft 29 and the collar 67 causes rotation of the first side gear 59 and the shaft 61 in the same direction and at the same speed of rotation as the input shaft. The disconnected driveshaft 41 is not driven. Rotation of the first side gear 59 causes rotation of the spider gears 57 which, in turn, causes rotation of the second side gear 63 in the opposite direction and, ordinarily, at the same (but opposite direction) rotational speed as the first side gear. Rotation of the second side gear 63, in turn, ultimately causes rotation of the forward axle shafts in the reverse direction. Thus, a powertrain 23 that can drive a vehicle in forward and reverse and that does not require a transmission 27 with a reverse gear can be provided.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A tandem axle vehicle, comprising:
    a powertrain, the powertrain comprising
        an input shaft,
        a forward drive axle assembly comprising a forward carrier assembly including a forward differential,
        a rear drive axle assembly coupled to the forward drive axle assembly via a connecting driveshaft and comprising a rear carrier assembly including a rear differential,
        the forward carrier assembly comprising an inter-axle differential (IAD), the IAD comprising an IAD housing, a differential spider comprising a plurality of legs attached to the IAD housing and a plurality of spider gears mounted on the legs, a first side gear engaged with the spider gears on a first side of the spider and arranged to drive a shaft for driving the driveshaft, and a second side gear engaged with the spider gears on a second side of the spider and arranged to drive the forward differential, and
        a clutch movable between an unlocked position, the clutch rotationally coupling the input shaft and the IAD housing when in the unlocked position, and a reverse position, the input shaft being rotationally decoupled from the IAD housing when the clutch is in the reverse position.

2. The tandem axle vehicle as set forth in claim 1, wherein the input shaft drives the first side gear when the clutch is in the reverse position.

3. The tandem axle vehicle as set forth in claim 1, wherein the clutch comprises a collar comprising one or more external splines adapted to mate with internal splines on the IAD housing and the first side gear.

4. The tandem axle vehicle as set forth in claim 3, wherein the collar is axially slidable on and non-rotatable relative to the input shaft and axially slidable to move the one or more external splines of the collar into and out of engagement with the internal splines on the IAD housing and the first side gear.

5. The tandem axle vehicle as set forth in claim 4, wherein the one or more external splines of the collar is always engaged with at least one of the internal spline on the IAD housing and the internal spline on the first side gear.

6. The tandem axle vehicle as set forth in claim 1, comprising a second clutch arranged to disconnect the shaft and the driveshaft when the clutch is in the reverse position.

7. The tandem axle vehicle as set forth in claim 6, wherein the second clutch comprises a collar axially slidable on the driveshaft between an engaged position and a disengaged position, the collar being non-rotatable relative to the driveshaft, the collar having an external spline adapted to engage with an internal spline of a shaft connected to the rear differential when the collar is in the engaged position.

8. The tandem axle vehicle as set forth in claim 1, comprising a second clutch arranged to rotationally lock the IAD housing when the clutch is in the reverse position.

9. The tandem axle vehicle as set forth in claim 8, wherein the clutch comprises a collar axially movably mounted on the input shaft, the collar moving when the clutch moves between the unlocked position and the reverse position, and the second clutch comprises a fork mounted on the collar and a spring-loaded piston in a splined engagement with the IAD housing and arranged to be moved by the fork to compress the spring so that splines on the piston and the forward carrier housing assembly engage when the collar moves as the clutch moves to the reverse position.

10. The tandem axle vehicle as set forth in claim 1, wherein the clutch is movable to a locked position in which the clutch rotationally couples the input shaft with the IAD housing and the first side gear.

11. The tandem axle vehicle as set forth in claim 1, wherein the second side gear is arranged to drive a pinion gear, the pinion gear being in meshing engagement with a ring gear, the ring gear being operably coupled to the forward differential.

12. The tandem axle vehicle as set forth in claim 11, wherein the shaft extends through the pinion gear.

13. The tandem axle vehicle as set forth in claim 12, wherein the shaft and the pinion gear are coaxial.

14. The tandem axle vehicle as set forth in claim 12, wherein the first side gear is disposed on a same side of the spider as the input shaft.

15. The tandem axle vehicle as set forth in claim 1, wherein the forward differential is operably coupled to a pair of forward axle shafts and the rear differential is operably coupled to a pair of rear axle shafts.

16. The tandem axle vehicle as set forth in claim 1, wherein the powertrain further comprises an engine and a transmission arranged to drive the input shaft.

17. A forward carrier assembly for a tandem axle vehicle, comprising:
    an inter-axle differential (IAD), the IAD comprising an IAD housing having an internal spline;
    a differential spider comprising a plurality of legs attached to the IAD housing and a plurality of spider gears mounted on the legs;
    a first side gear engaged with the spider gears on a first side of the spider, the first side gear having, an internal spline;
    a second side gear engaged with the spider gears on a second side of the spider; and
    a collar having one or more external splines, the collar being movable between a first position in which the one or more external splines engage with the internal spline of the IAD housing and the internal spline of the first side gear, and a second position in which the one or more external splines is disengaged from the internal spline of the IAD housing and engaged with the internal spline of the first side gear.

18. The forward carrier assembly as set forth in claim 17, wherein the collar is movable to a third position in which the one or more external splines is engaged with the internal spline of the IAD housing and disengaged from the internal spline of the first side gear.

19. The forward carrier assembly as set forth in claim 17, wherein the collar is movable so that at least one of the one or more external splines engages with at least one of the internal spline of the IAD housing and the internal spline of the first side gear.

20. The forward carrier assembly as set forth in claim 17, comprising a shaft adapted to be connected to a rear carrier assembly, the first side gear being mounted on the shaft.

21. The forward carrier assembly as set forth in claim 20, comprising a pinion gear and a ring gear, the pinion gear being in meshing engagement with the ring gear, the ring gear being operably coupled to a forward differential, the second side gear being arranged to drive the pinion gear.

22. The forward carrier assembly as set forth in claim 21, wherein the shaft extends through the pinion gear.

* * * * *